(12) United States Patent
Bercovici et al.

(10) Patent No.: US 7,627,247 B2
(45) Date of Patent: Dec. 1, 2009

(54) OPTICAL TIME DIVISION MULTIPLEXING

(75) Inventors: Luca Bercovici, Jerusalem (IL); Michael Braiman, Netanya (IL)

(73) Assignee: Optiway Ltd., Natanya (IL)

( * ) Notice: Subject to any disclaimer, the term of this patent is extended or adjusted under 35 U.S.C. 154(b) by 546 days.

(21) Appl. No.: 10/548,069

(22) PCT Filed: Mar. 4, 2004

(86) PCT No.: PCT/IL2004/000219

§ 371 (c)(1),
(2), (4) Date: May 3, 2006

(87) PCT Pub. No.: WO2004/079401

PCT Pub. Date: Sep. 16, 2004

(65) Prior Publication Data

US 2007/0019965 A1    Jan. 25, 2007

(51) Int. Cl.
*H04B 10/00* (2006.01)
*H04J 14/00* (2006.01)
(52) U.S. Cl. .......................... 398/75; 398/115
(58) Field of Classification Search .............. 398/74, 398/75, 115, 191
See application file for complete search history.

(56) References Cited

U.S. PATENT DOCUMENTS

| | | | |
|---|---|---|---|
| 5,903,368 A | 5/1999 | Desurvire et al. | |
| 5,926,297 A * | 7/1999 | Ishikawa et al. | 398/43 |
| 5,936,754 A | 8/1999 | Ariyavisitakul et al. | |
| 6,034,801 A | 3/2000 | Pfeiffer | |
| 6,556,323 B1 * | 4/2003 | Mikkelsen et al. | 398/154 |
| 2002/0003641 A1 * | 1/2002 | Hall et al. | 359/122 |
| 2004/0179849 A1 * | 9/2004 | Miyazaki | 398/147 |

FOREIGN PATENT DOCUMENTS

| | | |
|---|---|---|
| EP | 0593206 | 4/1994 |
| EP | 0849622 | 6/1998 |
| JP | 60126935 | 7/1985 |

\* cited by examiner

*Primary Examiner*—Dalzid Singh
(74) *Attorney, Agent, or Firm*—Mark M. Friedman

(57) ABSTRACT

A method of multiplexing optical signals in a node of an optical network including as inputs a plurality of electrical signals, a plurality of laser transmitters, and as outputs a plurality of optical fibers, (a) generating clock pulses as a first clock frequency; (b) dividing the clock pulses respectively into a number of parallel trigger outputs; (c) sampling the electrical signals respectively by triggering on the parallel trigger outputs; (d) converting the sampled electrical signals to sampled optical signals by modulating respectively the laser transmitters with the sampled electrical signals and outputting respectively the sampled optical signals on the optical fibers; (e) combining the sampled optical signals onto a single optical fiber.

11 Claims, 5 Drawing Sheets

OPTICAL TIME DIVISION MULTIPLEXING

FIELD AND BACKGROUND OF THE INVENTION

The present invention relates to optical communications and, more particularly, to a novel method of multiplexing optical signals onto a single optical fiber. Specifically, the method includes sampling multiple signals and coupling the sampled signals onto a single optical fiber. The optical multiplexing method, of the present invention, useful for both digital and RF analog signals, is applicable and for upgrading existing fiber optic communications networks and in new installations.

Multiplexing in optical fiber communications systems may be achieved by several existing technologies. The choice of multiplexing technology has a tremendous impact on the cost, performance and the upgradeability of the network. One multiplexing technology is wavelength division multiplexing (WDM). In WDM, data signals are each modulated on a separate wavelength of light and then coupled onto a single optical fiber. At the remote end of the optical fiber, the different wavelengths are optically separated and individually detected. WDM systems consequently require a large number of laser sources and detectors for each different wavelength.

An alternative to WDM that achieves high data rates on a single wavelength channel is known as optical time division multiplexing (OTDM). A typical OTDM system as shown in the diagram of FIG. 1 includes a single high speed pulsed laser 101. An optical splitter 103 splits the pulsed laser output. An external modulator 109 is used to modulate each signal onto an optical carrier. Optical delay lines 105, such as fibers of varying lengths, are used to inter-leave the pulsed signals of the different channels. The optical signals are then optically multiplexed by a combiner 111 onto a single optical fiber.

During the lifetime of fiber optic communications networks, there are often situations in which additional fiber is required but not available and upgradeability options are limited. Therefore, a method to easily upgrade a fiber optic communications network installed in the field would be advantageous. Current multiplexing technologies are not readily upgraded once they are installed. For instance, a fiber optic communications network that does not include WDM lasers installed cannot be upgraded using WDM without replacing all the laser transmitters and installing wavelength demultiplexers and/or filters at the receiver end. Upgrading a prior art OTDM network would require the installation of optical delay lines of precise delay values, a difficult procedure performed in the field.

There is thus a need for, and it would be highly advantageous to have a method of optical time division multiplexing by signal sampling which can be used to free optical fibers in an existing network that is straightforward to install and requires replacing a minimum number of existing network components.

SUMMARY OF THE INVENTION

According to the present invention there is provided a method of multiplexing optical signals in a node of an optical network including as inputs a plurality of electrical signals, a plurality of laser transmitters, and as outputs a plurality of optical fibers, including the steps of: (a) generating clock pulses at a first clock frequency; (b) dividing the clock pulses respectively into a number of trigger outputs carrying respective divided portions of the clock pulses at a second clock frequency equal to the first clock frequency divided by the number; (c) sampling the electrical signals respectively by triggering on the divided portions, thereby generating sampled electrical signals wherein sample durations of the sampled electrical signals are substantially equal to widths of the clock pulses; (d) converting the sampled electrical signals to sampled optical signals by modulating respectively the laser transmitters with the sampled electrical signals and outputting respectively the sampled optical signals on the optical fibers; and (e) combining the sampled optical signals onto a single optical fiber. Preferably, the sampling includes operationally connecting the trigger outputs to the respective laser transmitters and operationally connecting the electrical signals to the respective laser transmitters, and more preferably, sampling includes operationally connecting said trigger outputs to respective anodes of the respective laser transmitters and operationally connecting the electrical signals to respective cathodes of the respective laser transmitters.

According to the present invention there is provided a method, of multiplexing optical signals in a node of an optical network including a plurality of optical fibers, respectively transmitting a plurality of optical signals, including the steps of: (a) generating clock pulses at a first clock frequency; (b) dividing the clock pulses respectively into a number of trigger outputs carrying respective divided portions of the clock pulses at a second clock frequency equal to the first clock frequency divided by the number; (c) sampling the optical signals respectively by inputting the optical signals respectively into optical modulators and triggering the optical modulators on the divided portions, thereby generating sampled optical signals; and (d) combining the sampled optical signals onto a single optical fiber.

According to the present invention there is provided a system for multiplexing downlink optical signals in a site including multiple base transceiver stations, operationally connected to respective laser transmitters; the laser transmitters connected to multiple optical fibers respectively carrying the optical signals including: (a) a clock generating clock pulses at a first clock frequency; (b) a serial to parallel converter dividing the clock pulses respectively into a number of trigger outputs respectively carrying divided portions of the clock pulses at a second clock frequency equal to the first clock frequency divided by said number; (c) a plurality of laser transmitters operationally connected respectively to said trigger outputs; wherein the optical signals are sampled by driving the lasers on the respective divided portions; and (d) an optical coupler combining the optical fibers onto a single output optical fiber carrying a multiplexed optical signal. The system, further includes (e) an optical receiver connected to the output optical fiber, converting the multiplexed optical signal to a multiplexed electrical signal; (f) an RF amplifier connected to an output of said optical receiver, amplifying the multiplexed electrical signal; and (g) an antenna operationally connected to said RF amplifier broadcasting the multiplexed electrical signal.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
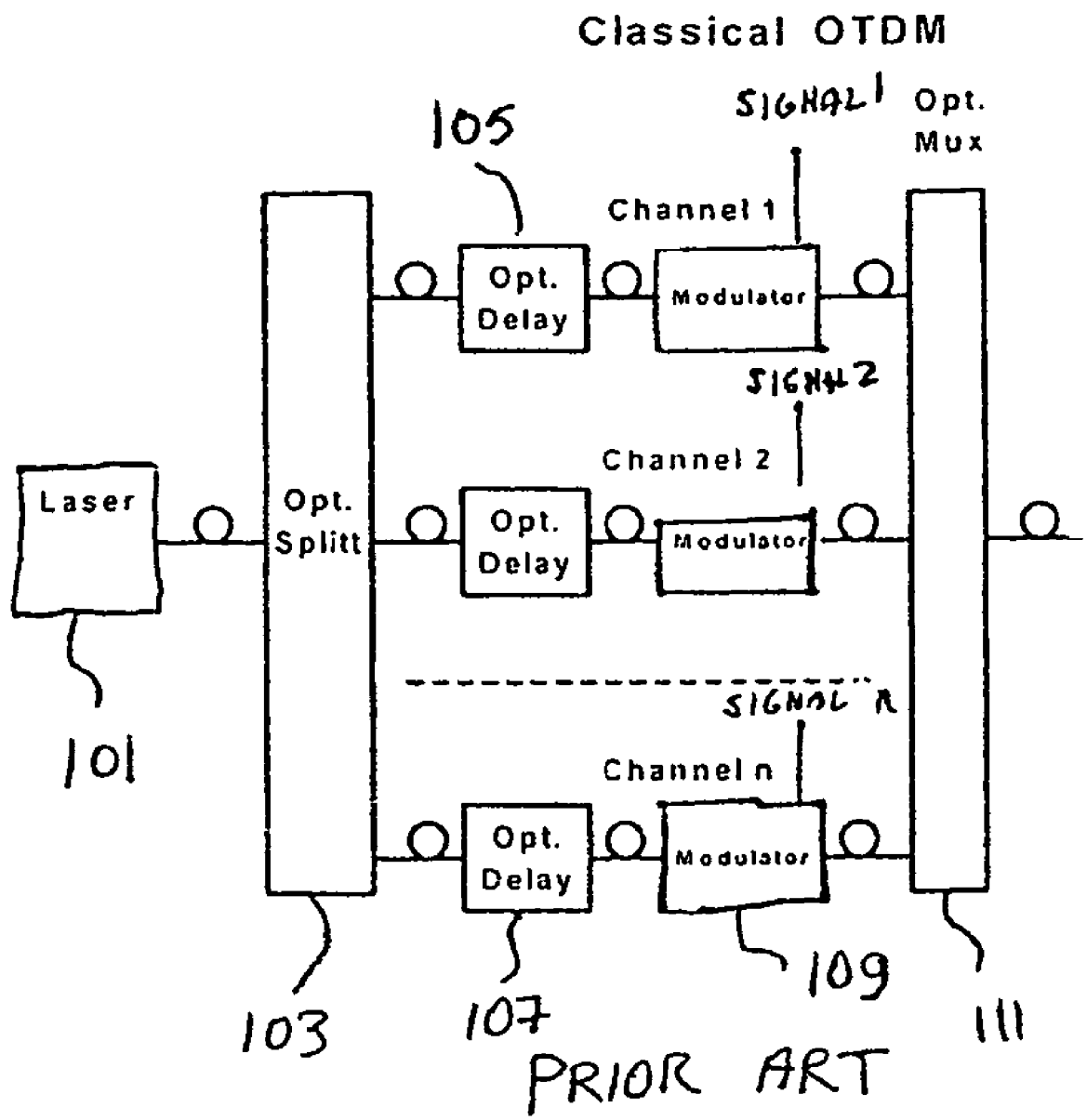
FIG. 1 is a prior art drawing of a conventional optical time division multiplex system.

The present invention is of a system and method of multiplexing optical signals onto a single optical fiber. Specifically, the system and method includes sampling multiple signals and optically coupling the sampled signals onto a single optical fiber. The present invention can be readily used to upgrade existing networks in the field and for new installations of fiber optic communications networks.

The principles and operation of a system and method of multiplexing optical signals by sampling individually multiple signals and coupling the sampled signals onto a single fiber, according to the present invention, may be better understood with reference to the drawings and the accompanying description.

It should be noted, that although the discussion herein relates to optical multiplexing with RF analog signals, the present invention may, by non-limiting example, be alternatively configured as well using digital data signals.

Once a signal is multiplexed, according to an embodiment of the present invention, demultiplexing is achieved using any of the methods known in the art. For moderate digital data rates, multiplexing is achieved, for instance, using well-known clock and data recovery circuits in the time domain. For high speeds or high frequency signals, gated optical external modulators may be used.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 2:
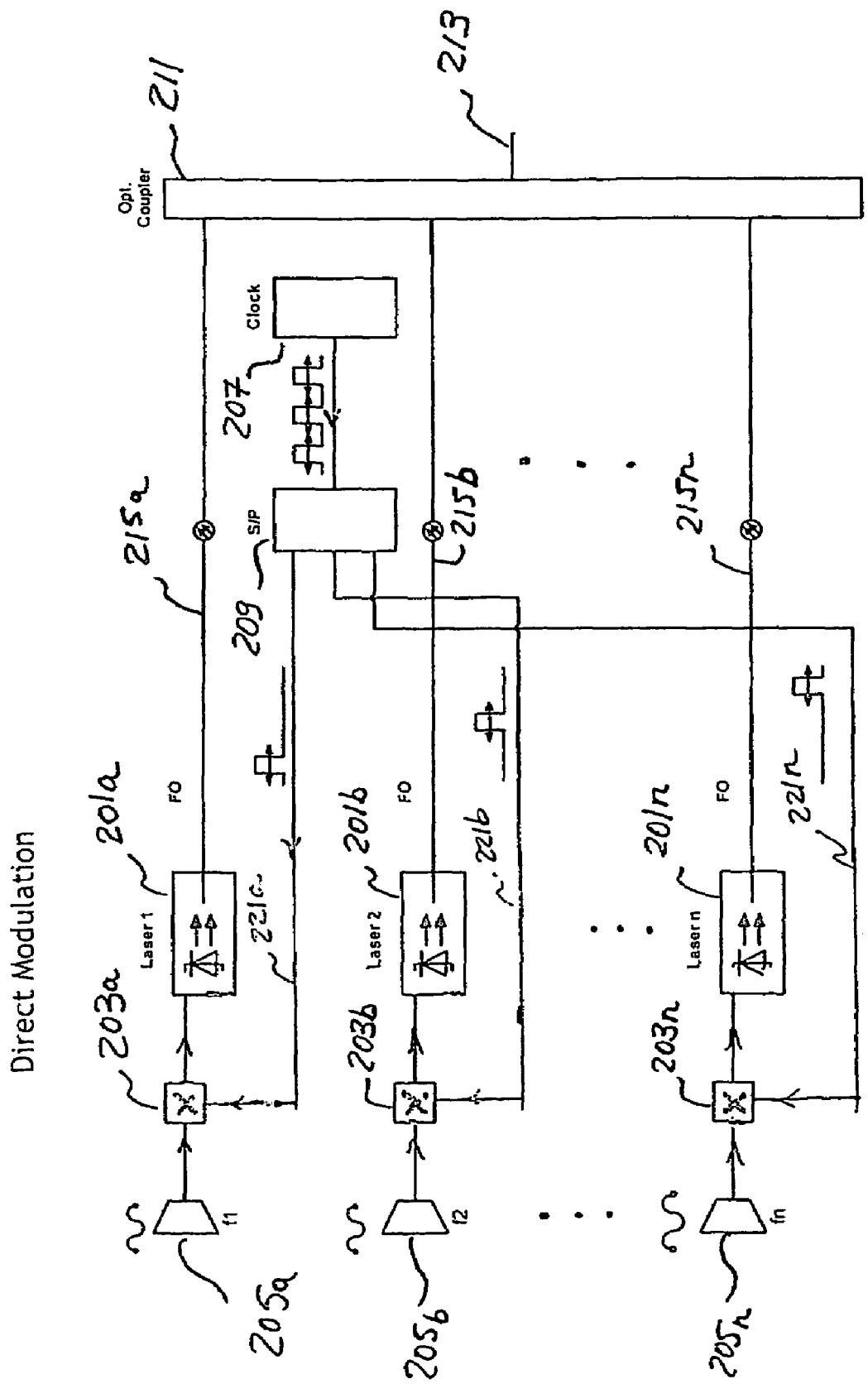
FIG. 2 is a drawing, according to an embodiment of the present invention, in a communications network using direct modulation laser sources.

Referring now to the drawings, FIG. 2 illustrates a system and method for multiplexing signals carried in several optical fibers into a single optical fiber, thereby freeing optical fibers for additional use in the optical network. An existing optical communications network includes multiple laser transmitters 201a to 201n. Laser transmitters 201a to 201n are directly modulated respectively, by varying the current bias on the laser diodes of laser transmitters 201 according to an electrical signal generated respectively by signal generators 205a to 205n. The modulated optical signals are carried by optical fibers 215a to 215n. The multiplexing system, according to a present invention, uses a clock 207 that generates a serial clock signal, e.g., serial pulses at a precise frequency. The clock rate, preferably according to Nyquist, is greater than twice the number of multiplexed channels multiplied by the maximum frequency transmitted per channel. The serial clock signal is input to a serial to parallel converter 209. Serial to parallel converter 209, has multiple trigger outputs 221a to 221n, a trigger output 221 to each sampling module 203. According to one embodiment of the present invention, serial to parallel converter 209 outputs a first pulse to sampling module 203a, a second pulse to sampling module 203b, and so on, cycling through all sampling modules 203 to sampling module 203n and then returning to first sampling module 203a. On receiving a clock pulse, sampling modules 203a to 203n, are triggered to sample their respective inputs and output the signal samples to laser transmitters 201a to 201n. Preferably, the time duration of the signal samples are similar to the clock pulse width. Consequently, laser transmitters 201a to 201n respectively have a "non-zero output" only when sampling modules 203a to 203n respectively are triggered. The term "zero output" refers to the type of modulation used, in digital modulation that is unipolar, "zero output" preferably means an optical output less than the laser threshold whereas in an analog output which is bipolar a "zero output" preferably refers to a bias point near half the peak maximum instantaneous output level of the laser diode. Sampled optical signals output for laser transmitters 201a to 201n are carried by optical fibers 215a to 215n respectively. The sampled signals are combined with an optical coupler 211. The optical time domain multiplexed signal is carried on a single optical fiber 213 freeing n−1 fibers for additional use in the network. In one embodiment of the present invention, sampling modules 203a to 203n include RF mixers that convolute the clock output with the signal input as input to laser transmitters 201a to 201n.

As an example, multiplexing 10 RF analog channels up maximum frequency 100 Mhz uses preferably a clock frequency of 2 Ghz. Laser transmitters 201 are preferably sampled at a frequency of 200 Mhz. The multiple sampled signals are consequently optical time division multiplexed onto a single optical fiber carrying 2 Ghz modulation from multiple laser transmitters.

Figure 2A:
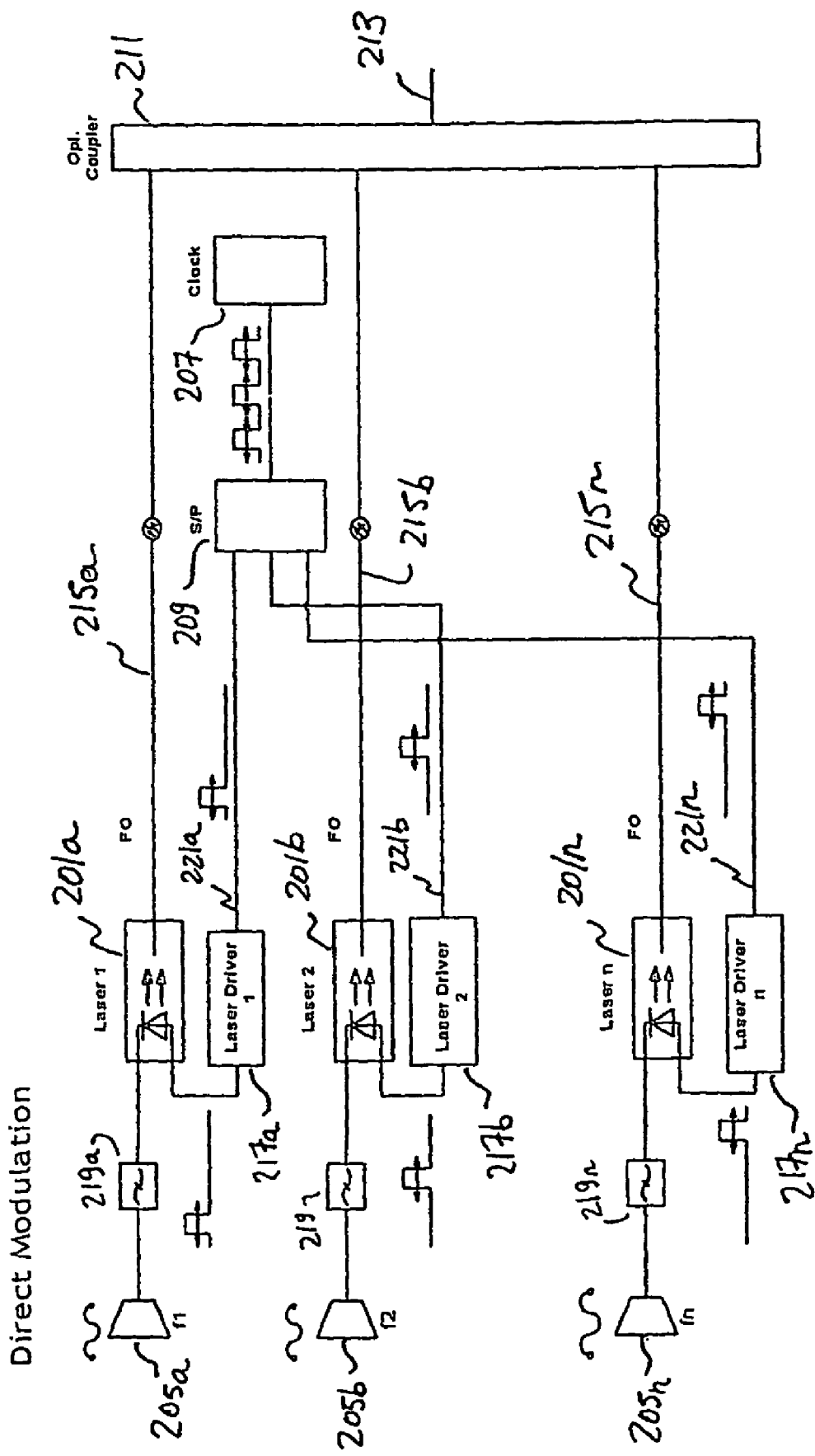
FIG. 2a is a drawing, according to another embodiment of the present invention, in a communications network using direct modulation laser sources.

In another embodiment of the present invention, shown in FIG. 2a, sampling may be achieved by driving laser transmitters 201a to 201n directly with both triggering pulses and outputs from generators 205a to 205n without requiring intervening sampling modules 203a to 203n. In FIG. 2a, laser drivers 217a to 217n receive clock pulses from trigger outputs 221a to 221n of serial to parallel converter 209 and drive the respective anodes of laser transmitters 201a to 201n. Outputs of RF signal generators 205a to 205n are connected to respective attenuators 219a to 219n to achieve appropriate signal levels, so as not to cause excess distortion in laser transmitters 201a to 201n, and operationally connected to the respective cathodes of laser transmitters 201a to 201n. The embodiment shown in FIG. 2a has an advantage over the embodiment of FIG. 2 since the embodiment of FIG. 2a requires fewer parts than the embodiment of FIG. 2 and does not require filters to provide isolation.

The present invention according to the embodiments shown in FIG. 2 and FIG. 2a have an advantage that with the exception of a simple, low cost and easy to install optical coupler 211, all the additional equipment required for multiplexing is in the electrical domain and may added into an existed network at relatively low cost.

Figure 3:
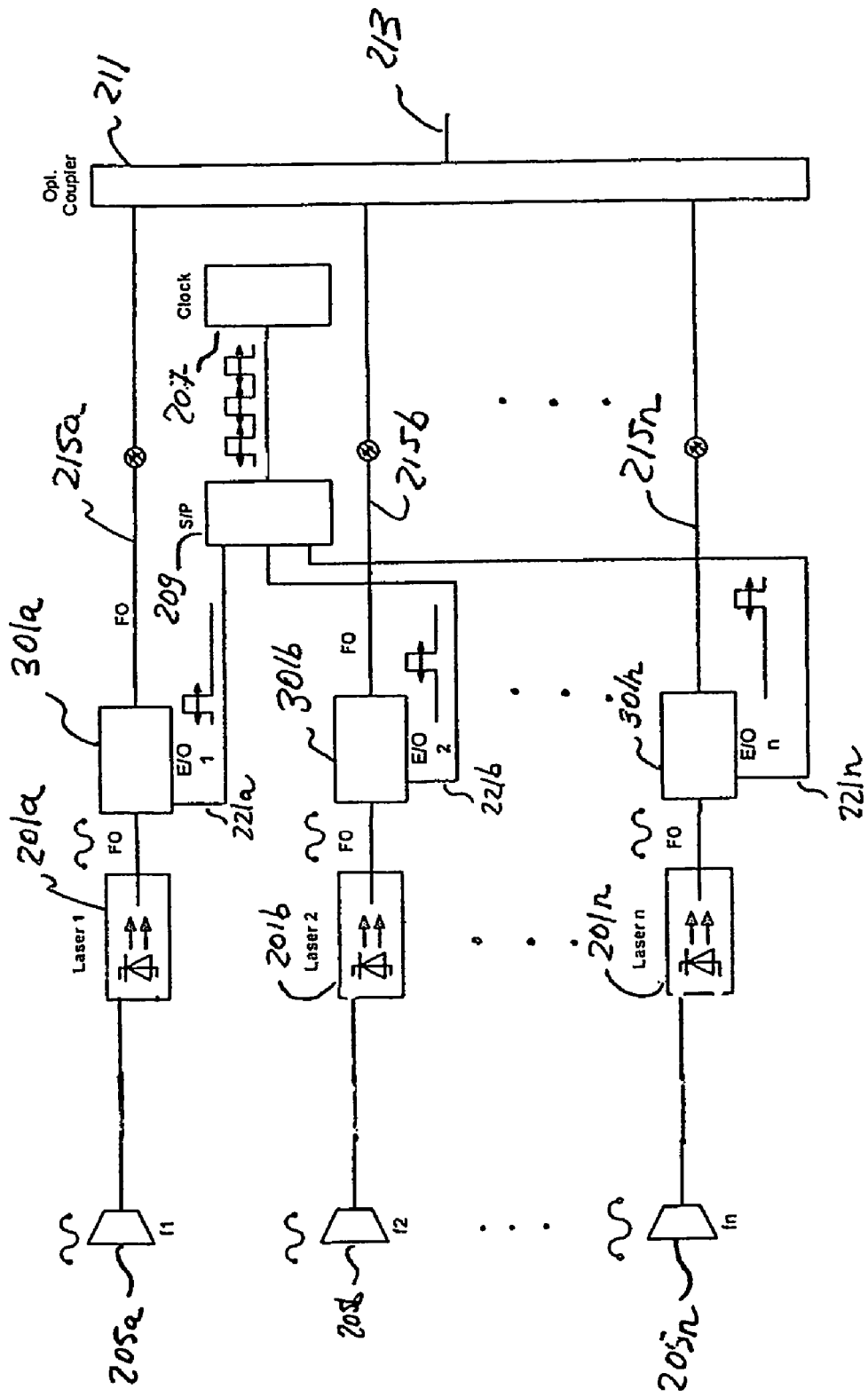
FIG. 3 is a is a drawing, according to an embodiment of the present invention, using external modulation of multiple optical signals.

Another possible configuration of the present invention is shown in FIG. 3. In the embodiment of FIG. 3, signal generators 205a to 205n are input to laser transmitters 201a to 201n. Modulated optical outputs from laser transmitters 201a to 201n are input to external modulators 301a to 301n. The serial clock signal output from clock 207 is input to serial to parallel converter 209. Serial to parallel converter 209, has multiple trigger outputs 221a to 221n, one trigger output 221 to each external modulator 301. Serial to parallel converter 209 outputs a first pulse to external modulator 301a, a second pulse to external modulator 301b, and so on, cycling through all the external modulators 301a to external modulator 301n and then returning to first external modulator 301a. On receiving a clock pulse, external modulators 301a to 301n, are triggered to sample their respective optical inputs and output the signal samples to optical fibers 215a to 215n respectively. Optical fibers 215a to 215n are optically combined by optical coupler 211 into a single optical fiber 213.

The embodiment of FIG. 3 is appropriate for fast clock rates. For instance, multiplexing 5 data channels operating at 2.5 Gbs (gigabit/sec) according to the present invention, requires clock 207 to output pulses at a frequency at least 25 Gbs. Alternatively, an embodiment similar to that of FIG. 3 using externally modulation may be configured using laser transmitters with fast rise and fall times of for instance 40 ps, characteristic of, for instance, a mode locked pulsed laser.

Figure 4:
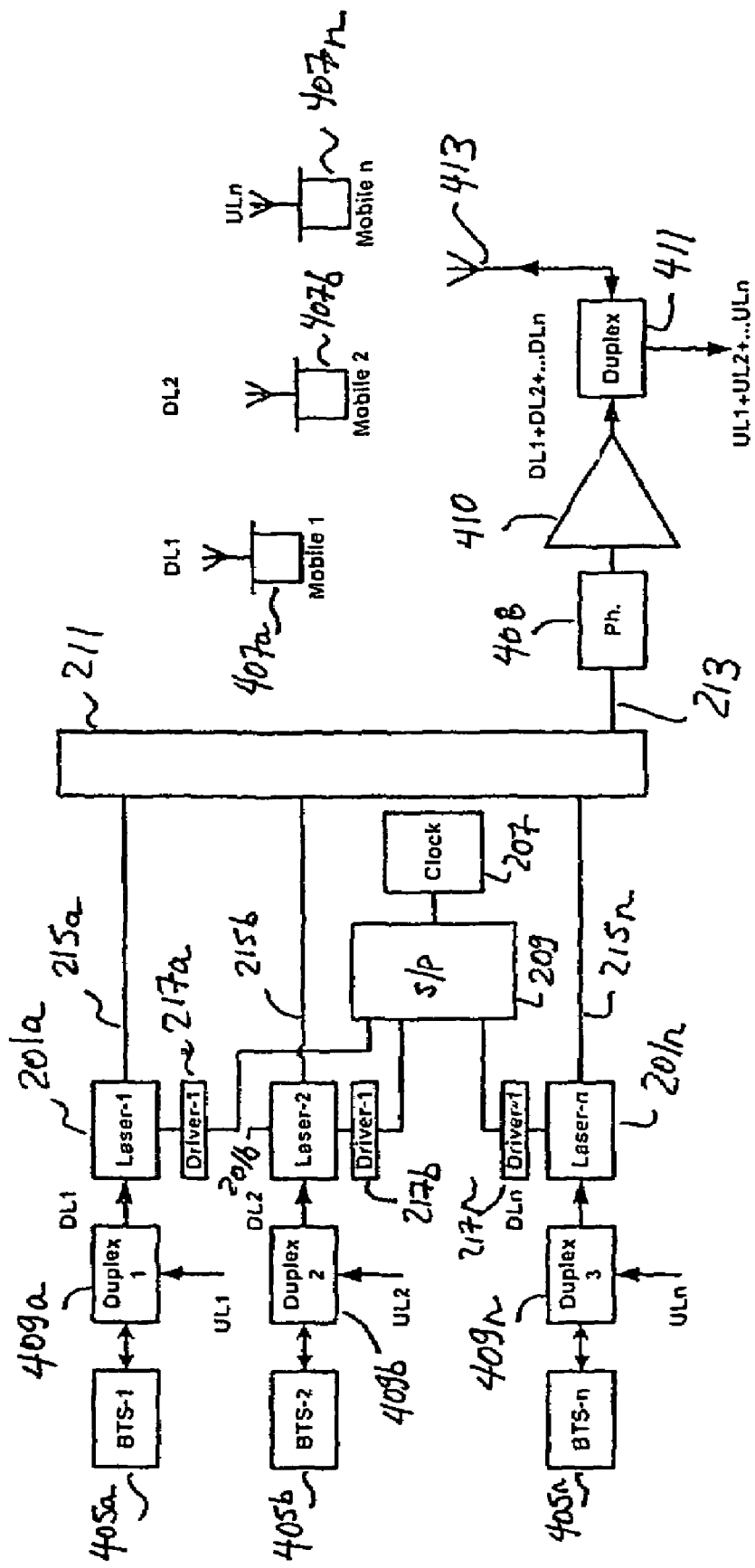
FIG. 4 is a drawing, according to an embodiment of the present invention, using direct modulation in a mobile telephone application.

Another embodiment of the present invention, shown in FIG. 4 is an application of optical time domain multiplexing in the field of mobile phone cellular communications. Referring to FIG. 4, base transceiver stations 405a to 405n are located at the same site. Base transceiver stations 405a to 405n belong to different cellular services. Alternatively, base transceiver stations 405a to 405n belong to the same cellular service but operate at frequency channels different from each other. Downlink (mobile receive) signals are output through uplink/downlink duplexers 409a to 409n and operationally connected, (after suitable attenuation, attenuators not shown) to laser transmitters 201a to 201n. As in the embodiments shown in FIG. 2 and FIG. 2a, clock 207 is operationally connected to respective laser transmitters 201a to 201n through serial to parallel converter 209 and through respective laser drivers 217a to 217n. Optical outputs 215a to 215n from laser transmitters 201a to 201n are optically combined in optical coupler 211; the multiplexed optical output is carried by single optical fiber 213. The optical signal carried by optical fiber 213 is received by an optical receiver 408 and converted into a multiplexed electrical signal. The multiplexed electrical signal is connected to an input of RF amplifier 410 and transmitted through an antenna duplexer 411 to antenna 413 for broadcasting. Mobile units 407a to 407n receive respectively signals from base transceiver stations 405a to 405n. The uplink (mobile transmit) signal path from antenna 413 to base station transceivers 405a to 405n is not shown in FIG. 4.

As an example, of the embodiment shown in FIG. 4, three base transceiver stations each have distinct downlink frequency bands within 800-900 Mhz. Clock 207 operates for instance at 6 Ghz. and laser transmitters 201a to 201n are sampled at 2 Ghz. However, RF amplifier 410 has a frequency response of for instance 1 Ghz. Therefore, RF amplifier 410 is not fast enough to amplify the sampling transitions of the signals and therefore sufficiently distortion free signals from base transceiver stations 405a to 405n are transmit from antenna 413.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A method of multiplexing optical signals in a node of an optical network including as inputs a plurality of electrical signals, a plurality of laser transmitters, and as outputs a plurality of optical fibers, comprising the steps of:
    (a) generating clock pulses at a first clock frequency;
    (b) dividing said clock pulses respectively into a number of trigger outputs carrying respective divided portions of said clock pulses at a second clock frequency equal to said first clock frequency divided by said number;
    (c) sampling the electrical signals respectively by triggering on said divided portions, thereby generating sampled electrical signals wherein sample durations of said sampled electrical signals are substantially equal to widths of said clock pulses;
    (d) converting said sampled electrical signals to sampled optical signals by modulating respectively the laser transmitters with said sampled electrical signals and outputting respectively said sampled optical signals on the optical fibers; and
    (e) combining said sampled optical signals onto a single optical fiber.

2. The method, according to claim 1, wherein said (c) sampling includes operationally connecting said trigger outputs to the respective laser transmitters and operationally connecting the electrical signals to the respective laser transmitters.

3. The method, according to claim 1, wherein said (c) sampling includes operationally connecting said trigger outputs to respective anodes of the respective laser transmitters and operationally connecting the electrical signals to respective cathodes of the respective laser transmitters.

4. A system for multiplexing downlink optical signals in a site including multiple base transceiver stations, operationally connected to respective laser transmitters, the laser transmitters connected to multiple optical fibers respectively carrying the optical signals, comprising:
    (a) a clock generating clock pulses at a first clock frequency;
    (b) a serial to parallel converter dividing said clock pulses respectively into a number of trigger outputs carrying respective divided portions of said clock pulses at a second clock frequency equal to said first clock frequency divided by said number;
    (c) a plurality of laser transmitters operational connected respectively to said trigger outputs; wherein the optical signals are sampled by driving said lasers on said divided portions;
    (d) an optical coupler combining the optical fibers onto a single output optical fiber carrying a multiplexed optical signal;
    (e) an optical receiver connected to said output optical fiber, converting said multiplexed optical signal to a multiplexed electrical signal;
    (f) an RF amplifier connected to an output of said optical receiver, amplifying said multiplexed electrical signal; and
    (g) an antenna operationally connected to said RF amplifier broadcasting said multiplexed electrical signal.

5. A method of time division multiplexing of radio frequency (RF) signals in a node of an optical network that includes a plurality of laser transmitters having respective laser transmitter anodes and cathodes, the method comprising the steps of:

(a) directly modulating each laser transmitter between an on state and an off state using a clock and using a respective one of trigger outputs applied to each laser transmitter anode; and (b) applying RF signals generated by electrical signal generators to each laser transmitter cathode, whereby the direct modulation of each said laser transmitter and the application of said RF signals combine to provide sampled modulated optical signals that carry RF information.

6. The method of claim 5, wherein said step of directly modulating each laser transmitter between an on state and an off state using a clock includes directly modulating each laser transmitter between an on state and an off state using a separate clock for each laser transmitter.

7. The method of claim 5, further comprising the step of combining at least one sampled modulated optical signal with at least one other optical signal into a combined optical signal transmitted through a single optical fiber.

8. A system for multiplexing downlink optical signals in a site that includes multiple radio frequency (RF) signals transceiver base stations operationally connected to respective laser transmitters the laser transmitters connected to multiple optical fibers respectively carrying the optical signals, the system further including a clock that generates serial clock pulses at a first clock frequency and a serial to parallel converter that divides the clock pulses into a number of trigger outputs carrying respective divided clock pulse portions at a second clock frequency, the system comprising:

(a) a plurality of electrical signal generators for applying RF signals to respective cathodes of the laser transmitters, said RF signals used in combination with the trigger outputs to provide sampled optical signals from said RF signals; and (b) an optical coupler that combines optical signals carried in the multiple optical fibers with said sampled optical signals into a multiplexed optical signal carried in a single optical fiber.

9. The system of claim 8, wherein said electrical signal generators are radio RF signal generators.

10. The system of claim 8, further comprising a plurality of base transceiver stations, each said base transceiver station operationally coupled to a respective laser transmitter.

11. The system of claim 10, further comprising:

(c) an optical receiver connected to said single output optical fiber, for converting said multiplexed optical signal into a multiplexed electrical signal;

(d) a RF amplifier connected to an output of said optical receiver, for amplifying said multiplexed electrical signal; and (e) an antenna operationally connected to said RF amplifier for broadcasting said multiplexed electrical signal.

* * * * *